United States Patent [19]

Stagars et al.

[11] Patent Number: 4,787,789
[45] Date of Patent: Nov. 29, 1988

[54] FIXING AND LOCKING DEVICE FOR CONTAINERS OF THE BOX PALLET TYPE WHICH ARE TO BE TRANSPORTED ON VEHICLES

[75] Inventors: Hans-Werner Stagars, Bevenroder Str. 90A, 3300 Braunschweig, Fed. Rep. of Germany; K. H. H. F. Karl-Christian Amme, Braunschweig, Fed. Rep. of Germany

[73] Assignee: Hans-Werner Stagars, Fed. Rep. of Germany

[21] Appl. No.: 35,907

[22] Filed: Apr. 3, 1987

[30] Foreign Application Priority Data

Apr. 5, 1986 [DE] Fed. Rep. of Germany ....... 3611837

[51] Int. Cl.⁴ ............................ B60P 1/64; B60P 7/13
[52] U.S. Cl. ...................................... 410/80; 410/69; 410/82; 410/90
[58] Field of Search ................. 410/46, 69, 77, 80, 410/81, 82, 83, 90, 91

[56] References Cited

U.S. PATENT DOCUMENTS 4,249,684  2/1981  Miller et al. ................... 410/90 X

FOREIGN PATENT DOCUMENTS 3517578  11/1986  Fed. Rep. of Germany .

Primary Examiner—Gerald A. Michalsky
Attorney, Agent, or Firm—Salter & Michaelson

[57] ABSTRACT

A fixing and locking device for containers of the box pallet type which are to be transported on vehicles, having fork-engaging channels and elongated feet which are fixed to the underside of the container in each case in the area of the four corners. Fixing rails on/in the loading surface of the vehicle or on/in the upper side of the containers are provided with openings into which the feet engage. The feet (36, 38) in each case have a perpendicular web (40) which extends parallel to the fork-engaging channels (32) of the container (30) and which, with its upper margin (42), can be connected to the underside of the container and is provided on its underside with flange legs (46, 48) projecting on both sides. The fixing rails (2) essentially extend over the depth of the container and are made essentially U-shaped in cross-section and are provided with two sections (50, 56) which are at a distance from one another in the longitudinal direction of the rails and in which flanges (10, 20), which extend toward one another and form undercuts, are provided on the leg ends of the fixing rails. The undercut sections are at a distance ($L_3$) from one another which is greater than the length ($L_5$) of the flange legs (46, 48) of the feet (36, 38) on the container and, at one end, are at a distance ($L_1$) from the end of the fixing rail. Moreover, means (38) are provided for locking at least one of the feet of the container in/on the fixing rail. For fixing tightening straps, lock bolts (66) which can be inserted into the undercut sections (50, 56) are provided with eye rings (68).

16 Claims, 2 Drawing Sheets

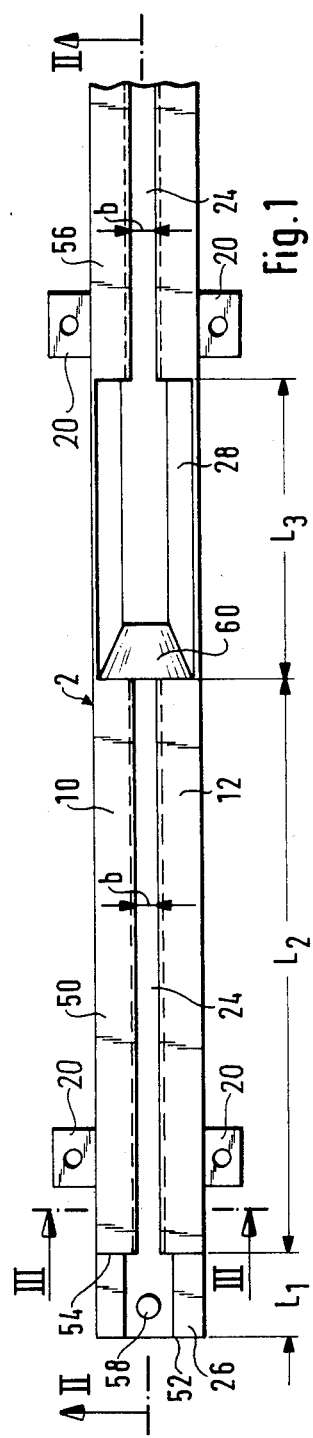
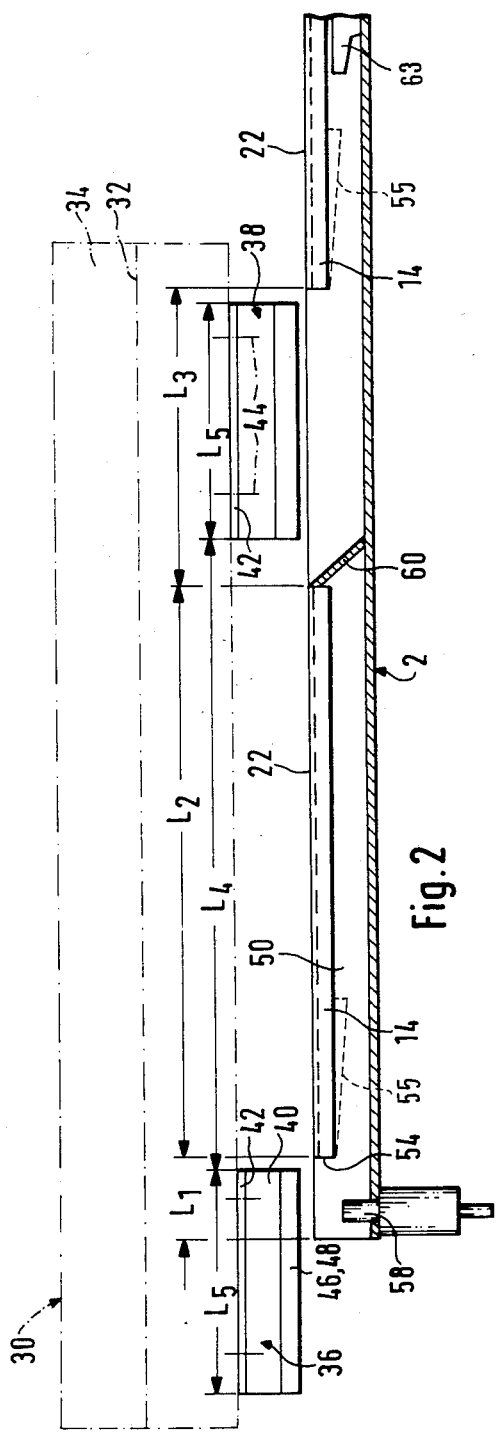

FIXING AND LOCKING DEVICE FOR CONTAINERS OF THE BOX PALLET TYPE WHICH ARE TO BE TRANSPORTED ON VEHICLES

The invention relates to a device for containers of the box pallet type which are to be transported on vehicles.

BACKGROUND OF THE INVENTION

Containers of the box pallet type are such containers whose base is designed along the lines of a pallet, with two engaging channels for the forks of a forklift truck being provided in the base at a standard distance. Moreover, the containers can be made in a box shape with enclosed walls, with a displaceable opening being provided preferably on the side with the fork engagement. But the containers can also be made as open lattice containers.

DESCRIPTION OF THE PRIOR ART

In a known locking device (DE-A No. 3,517,578), elongated feet of rectangular cross-section are in each case fixed on the underside of the container in the area of the four corners, which feet extend at right-angles to the fixing rails provided with cross slots and engage into these cross slots. Moreover, further separate locking means in the form of a turning bolt are provided which engage into adjacent slots of the fixing flanges. Fixing and locking devices of this type have the disadvantage that the projections normally acting as feet only have a small cross-section and placing the containers onto the vehicles equipped with the fixing rails has to be effected with great accuracy in both the longitudinal direction and the transverse direction. Once the containers are placed on they then have to be secured by the turning bolt against lifting.

SUMMARY OF THE INVENTION

The object of the invention is to design a fixing and locking device such that the projections or feet can be equipped with substantially larger contact surfaces and placing onto and subsequently fixing and locking the containers on the vehicles or containers provided with fixing rails requires substantially less accurate work by the driver of the fork-lift truck.

For this purpose, a fixing and locking device is provided which has elongated feet, which are to be fixed to the underside of the container in each case in the area of the four corners, and has fixing rails which are to be fixed on/in the loading surface of the vehicle or on/in the upper side of the containers and are provided with openings into which the feet engage, with the feet in each case having a perpendicular web which extends parallel to the fork-engaging channels of the container and which, with its upper margin, can be connected to the underside of the container and is provided on its underside with flange legs projecting on both sides, the fixing rails essentially extending over the depth of the container and being made essentially U-shaped in cross-section and being provided with two sections which are at a distance from one another in the longitudinal direction of the rails and in which flanges, which extend toward one another and form undercuts, are provided on the leg ends of the fixing rails so that the undercut sections are at a distance from one another which is greater than the length of the flange legs of the feet on the container and, at one end, are at a distance from the end of the fixing rail, and means being provided for locking at least one of the feet of the container in/on the fixing rail.

BRIEF DESCRIPTION OF THE DRAWING

An exemplary embodiment of the invention is described in detail below with reference to the drawing, in which:

FIG. 1 shows a plan view of a fixing rail,

FIG. 2 shows the section along line II—II in FIG. 1,

DESCRIPTION OF THE PREFERRED EMBODIMENT IN DETAIL

Figure 3:
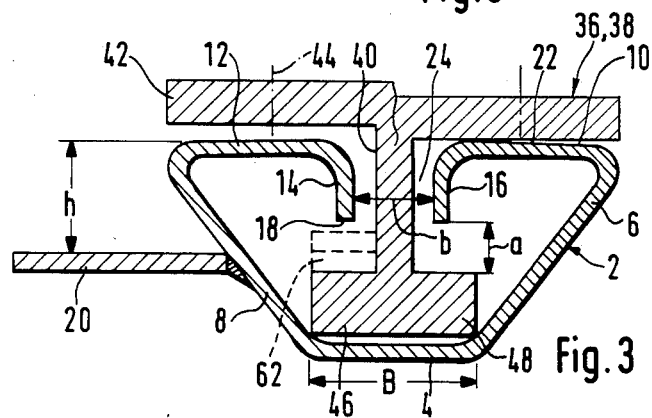
FIG. 3 shows the section along line III—III in FIG. 1.

As can be seen from FIG. 3, the fixing rail 2 shown in FIGS. 1 to 3 has an approximately U-shaped cross-section with a horizontal web 4, adjoining which are the two legs 6 and 8, both of which, in the exemplary embodiment shown, are inclined outward at an angle relative to the vertical to web. Flanges 10 and 12 adjoin the leg ends, which flanges 10 and 12 extend toward one another and, at their free margins, are provided with folded portions 14 and 16, the lower margin 18 of which is at a distance from the web 4. The profiles can be folded or rolled from sheet metal. However, extruded profiles, for example of aluminum or aluminum alloys, can also be provided. As shown in FIG. 3 on the left-hand side, fixing flanges or rails 20, can be provided on the outside of the legs 6 and 8, which fixing flanges or rails 20 can, for example, be at a distance h from the upper side 22 of the profile flanges 10 and 12, which distance h can be the board height of a board covering of a vehicle. The profile can then be fitted as a supporting profile in a floor frame of a vehicle. However, the fixing rails can also be arranged in or on the upper side of a container for fixing a further container in a stack.

In the profile described, the flanges 10 and 12, if necessary in conjunction with the folded portions 14 and 16, if such are provided, form undercuts with a slot 24 formed between the folded portions 14 and 16 and having a width b at right-angles to the longitudinal extent of the profile.

As shown in FIGS. 1 and 2, the flanges 10 and 12 with the folded portions are cut away from this fixing rail at the left-hand end in a section over a length L1. In the same manner, at a distance L2 therefrom, a further section 28 is provided with a length L3 in which the flanges 10 and 12 with the folded portions 14 and 16 respectively are likewise cut away.

Figure 5:
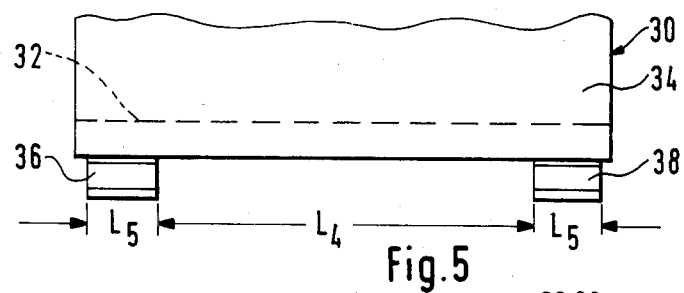

As indicated in FIG. 5, two feet 36 and 38 which have a length L5 are arranged at a distance L4 on the underside of a container 30 in the area of the end walls 34 lying parallel to the fork-engaging channels 32 indicated here in a broken line.

The feet are shown in cross-section in FIG. 3. Roughly speaking, the feet 36 and 38 are made with an I-profile having different flange lengths. Here, a flange plate 42 adjoins the web 40, which flange plate 42 is provided with fixing holes 44 and with which the feet are fixed to the underside of the container. The opposite flange has two flange legs 46 and 48, the width B of which is substantially larger than the width b of the slot 24. The width B can correspond to the width of the web 4 on the inside of the profile 2. The supporting edges can be made rounded.

With respect to the dimensions of the rails, the distance L4 of the feet on the container is greater than the length L2 of the undercut section 50 of the fixing rail 2. Moreover, the length L3 of the cut-free section 28 of the fixing rail is greater than the length L5 of the feet, with L2+L3 being greater than L4+L5.

The fixing rail is fixed in or on the loading surface of a vehicle such that the section 26 is located in the area of a free edge of the loading surface. The end 52 of the fixing rail can, for example, be flush with the margin of the loading edge. In the arrangement in or on the upper side of a container which is provided with an opening on a broadside, the section 26 should be facing toward this broadside.

With the dimensions described, the container 30, which in FIG. 2 is shown in broken lines, is guided with the fork-lift truck over the loading surface such that the rear feet 38 lie on both sides over the cut-out sections 28 of the fixing rails. The front feet 36 are then located in the area of the front, cut-free section 26 in front of the adjacent end 54 of an undercut section 50. When the container is moved into this position by the forklift truck, the container is lowered, with the feet coming to bear with their contact surface on the web 4 of the fixing rail, as shown in FIG. 3, or lying directly above the web; in each case the weight of the container is still supported by the fork-lift truck. By the forks being pushed forward, the feet 36 and 38 are then inserted into undercut sections 50 and 56 respectively of the fixing rail, with it being possible for the en position to be established by a stop, for example in the area of the undercut section 56. Once this push-in movement is complete, the container is then deposited with its own weight onto the vehicle or a container by the fork-lift truck. As a result of the design of the feet, the container is now secured against lifting and also against tilting movements, because the upper edges of the flange sections 46 and 48 of the feet lie beneath the folded portions 14 and 16 of the profile.

To prevent the container sliding out with its feet out of the fixing rail, locking pins 58 are provided in the area of the cut-free section 26, which locking pins 58, for example, protrude through the web of the fixing rail and, in the projecting position according to FIG. 2, lie in the path of movement of the adjacent foot of the container in the longitudinal direction of the fixing rail. The locking device 58 can be spring-actuated and can be retracted, for example, via a pivot lever which is under spring tension and has an eccentric. Moreover, such a known locking device can be of self-releasing design. At the start of an operation to remove the container, the lock bolt then only needs to be retracted via the actuating lever. When a container is placed on, the retraction device for the lock bolt is then automatically released when the adjacent foot of the container comes into engagement with the lock bolt. Once the foot slides past during the push-in movement, the lock bolt then springs automatically into its effective position. The outwardly inclined legs 6 and 8 of the fixing rails act as guides at right-angles to the longitudinal extent of the fixing rails, whereby the accuracy required on approaching the fixing rails is considerably reduced. A guide effect can also be achieved in the longitudinal direction of the fixing rails by a sloping wall 60 which is arranged transversely in the profile and can be provided, for example, at the end of the undercut section 50 adjacent to the cutfree section 28. This sloping wall 60 is inclined away from the end of the undercut section 50 toward the web. The container, when being inserted into the fixing rail, can be guided in its longitudinal direction on this sloping wall. Slopes 55 can also be provided on the marginal edges of the folded portions 14 and 16, the slopes 55 rising in the longitudinal direction of the folded-over portions 14 and 16.

In a different embodiment from the representation according to FIG. 3, the feet 36 and 38 can also be designed such that, with the underside of the flange plate 42, they sit on the upper side 22 of the flanges 10 and 12 of the fixing rail, namely either directly or else under the interposition of slides (not shown in the drawing). In this case, the foot, with the two flange legs 46 and 48, is at a distance above the web 4 of the fixing rails.

Figure 4:
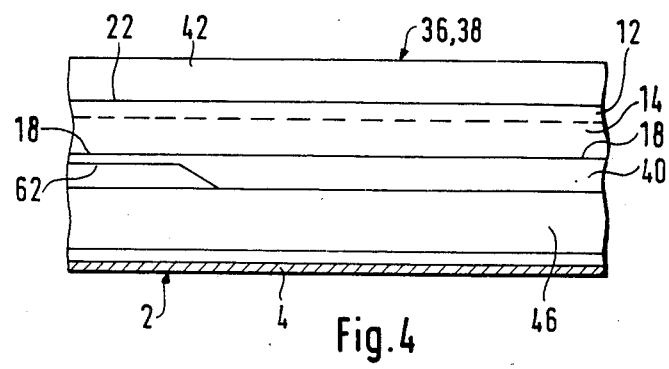
FIG. 4, in a detail of one of the undercut sections of the fixing rail, shows an arrangement and design of the container foot, FIG. 5 schematically shows the arrangement of the feet on the container.

The distance a between the lower edge of the folded portions 14 and 16 and upper side of the flange legs 46 and 48 is a measure of the degree of freedom available to the fork-lift truck when the forks pass through. However, this distance also results in clearance between the parts, and the container can be lifted or tilted about one of the feet by this amount of clearance. To reduce such a tilting movement, locking wedges 62 can be arranged on the upper side of at least one of the flange legs 46 and 48, as shown in broken lines in FIGS. 3 and 4, with FIG. 4 otherwise showing the design in which the flange plate 42 sits on the flange upper side of the fixing rail. This wedge 62 can be arranged such that it is arranged at the feet end located at the rear during the push-in movement, so that locking only becomes effective during the last phase of the push-in movement.

Moreover, wedge or sloping surfaces 63 can be provided at the end of at least one of the undercut sections 56, which wedge or sloping surfaces 63 interact with the upper side of the flange legs of the feet.

Moreover, if an extruded profile is used, instead of the folded legs 14 and 16, toroidal reinforcing portions can also be provided on the ends of the legs 10 and 12, whereby the overall height of the fixing rails can also be reduced if necessary.

The fixing rails preferably lie transversely on the loading surface of a vehicle. They can, for example, extend over the entire width of the loading surface, in which case two halves can then be provided in mirror image in a design corresponding to FIGS. 1 and 2 so that containers can be inserted into the fixing rails from both longitudinal sides of the loading surface.

Figure 6:
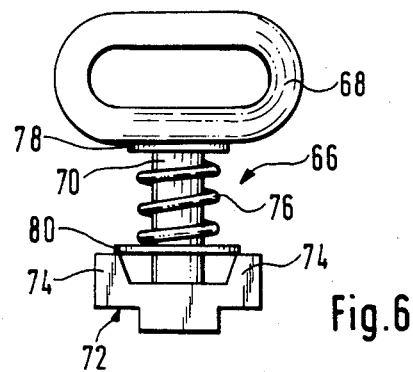
FIG. 6 shows a fixing element for fixing lashing straps to the fixing rail.

Fixing rails of the type described in or on the loading surface of a vehicle provide the possibility of attaching lock bolts as fixing points for lashing straps for loose goods or packages on the loading surface. Such a lock bolt 66 is shown in FIG. 6. It has an oval eye ring 68, on the underside of which is fixed a bar 70. On the lower end of this bar a locking head 72 is rigidly connected to the bar 70. This locking head is made approximately U-shaped in cross-section, with the inner dimensions between the legs 74 being selected such that the folded portions 14 and 16 of the fixing rail can engage into the U-profile of the locking head. The thickness of the locking head is selected such that it can be inserted into the slot 24 of the fixing rail, in other words its thickness is slightly smaller than its width b.

A pretensioned compression spring 76 is arranged on the bar 70, which compression spring 76 is supported with one end against a disk 78, bearing against the underside of the eye 68, and at the other end against a disk 80. At the same time, the disk 80 is of such a diameter that it sits on the ends of the legs of the locking head.

The lock bolt 66 described is inserted with the locking head 72 into one of the undercut sections of the fixing rail. During this procedure it comes into contact with the disk 80 on the upper side 22 of the flanges 10 and 12. With the eye 68, the locking head is then pressed downward against the spring force until the locking head is rotatable beneath the free ends of the folded portions 14 and 16. After a 90° turn, the fixing eye is then released and the lock bolt is then tensioned in the fixing rail via the spring. At the same time, a strap pulled through the eye is then supported with its tensile force directly against the fixing rail.

Lock bolts of the said type can be attached at any point of an undercut section of a fixing rail of the type described above. In addition, it is possible, between fixing rails for the containers, to attach such for lock bolts of the type described which can then be made with a continuous undercut with which it is then possible, therefore, to attach a strap fixing at any point of the fixing rail. Such fixing rails can also act as supporting elements for the vehicle loading surface.

We claim:

1. A fixing and locking device for containers of the box pallet type which are to be transported on vehicles, having fork-engaging channels and elongated feet which are to be fixed to the underside of the container in each case in the area of the four corners, and having fixing rails which are to be rigidly connected to a supporting body and are provided with openings into which the feet engage, with the feet (36, 38) in each case having a perpendicular web (40) which extends parallel to the fork-engaging channels (32) of the containers (30) and which, with its upper margin (42), can be connected to the underside of the container and is provided on its underside with flange legs (46, 48) projecting on both sides, the fixing rails (2) essentially extending over the depth of the container and being made essentially U-shaped in cross-section and being provided with two sections (50, 56) which are at a distance from one another in the longitudinal direction of the rails and in which flanges (10, 12), which extend toward one another and form undercuts, are provided on the leg ends of the fixing rails so that the undercut sections are at a distance ($L_3$) from one another which is greater than the length ($L_5$) of the flange legs (46, 48) of the feet (36, 38) on the container and, at one end, are at a distance ($L_1$) from the end of the fixing rail, and means (38) being provided for locking at least one of the feet of the container in the fixing rail.

2. In the device as claimed in claim 1, said fixing rails each having a horizontal web (4) and a pair of legs (6, 8) extending upwardly from the horizontal web (4) thereof, at least one of the legs (6, 8) of each fixing rail (2) being inclined outwardly in its upward extent.

3. The device as claimed in claim 1 or 2, in which, at the rear side of the first undercut section (50) located at a distance from the end of the fixing rail, which rear side faces toward the second undercut section (56), a sloping transverse wall (60) is arranged in the fixing rail (2), which sloping transverse wall (60) is inclined in the direction of the second section toward the web of the fixing rail.

4. The device as claimed in claim 1, in which the flanges (10, 12) of the fixing rails (2), which flanges (10, 12) form the undercut sections (50, 56), are folded toward the web of the fixing rail at their free margins (14, 16) facing toward one another.

5. The locking device as claimed in claim 4, in which at least the free margin of one of the folded portions (14, 16) is provided with a slope (55) rising in the longitudinal direction.

6. The device as claimed in claim 1, in which the feet (36, 38) are provided with flange plates (42) on the upper side of the web (40).

7. The device as claimed in claim 6, in which the webs (40) are of such a height that the feet, with the underside of the flange plates (42) or slides arranged thereon, sit on the upper side of the flanges (10, 12) of the undercut sections (50, 56) of the fixing rails (2).

8. The device as claimed in claim 1, in which locking wedges (62) are made or fixed on the upper side of the flange legs (46, 48) of the feet (36, 38).

9. The device as claimed in claim 1, in which, at the end of at least one of the undercut sections (50, 56), wedge or sloping surfaces (63) are provided which interact with the upper side of the flange legs (46, 48) of the feet (36, 38).

10. The device as claimed in claim 1, in which a locking pin (58) is provided which projects through the web (4) of the U-shaped fixing rail (2) into the rail profile.

11. The device as claimed in claim 10, in which the locking pin (58) is under spring pretension and is of self-releasing design.

12. The device as claimed in claim 10, in which the locking pin (58) is arranged at the entry end of the fixing rail (2).

13. The device as claimed in claim 1, in which lock bolts (66) which can be inserted into the undercut sections (50, 56) are provided with eye rings (68) for fixing tightening straps.

14. The device as claimed in claim 13, in which the lock bolt is provided with a U-shaped locking head (72) on the end of a bar (70), on the other end of which the eye ring (68) is fixed with the longitudinal extent at right-angles to the bar axis, and a compression spring (76) is arranged on the bar, which compression spring (76), with its end which faces toward the locking head (72), bears against a disk (80) which is guided on the bar and which bears under the spring pretension against the end surfaces of the legs (74) of the locking head (72).

15. In the device of claim 1, said fixing rails being adapted to be mounted on the loading surface of a vehicle.

16. In the device of claim 1, said fixing rails being adapted to be mounted on the upper side of a container.

* * * * *